United States Patent
Xu et al.

(10) Patent No.: US 9,686,752 B2
(45) Date of Patent: *Jun. 20, 2017

(54) METHOD FOR CONFIGURED MAXIMUM OUTPUT POWER REPORTING AND USER EQUIPMENT

(71) Applicant: FUJITSU LIMITED, Kawasaki-shi, Kanagawa (JP)

(72) Inventors: Haibo Xu, Beijing (CN); Yanling Lu, Beijing (CN); Weiwei Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,522

(22) Filed: Aug. 23, 2016

(65) Prior Publication Data
US 2016/0360491 A1  Dec. 8, 2016

Related U.S. Application Data

(63) Continuation of application No. 14/945,813, filed on Nov. 19, 2015, which is a continuation of application
(Continued)

(51) Int. Cl.
*H04B 7/00* (2006.01)
*H04W 52/14* (2009.01)
(Continued)

(52) U.S. Cl.
CPC ......... *H04W 52/146* (2013.01); *H04L 5/0053* (2013.01); *H04W 24/10* (2013.01);
(Continued)

(58) Field of Classification Search
CPC . H04W 52/365; H04W 52/367; H04W 24/10; H04W 74/002; H04L 5/0053
(Continued)

(56) References Cited

U.S. PATENT DOCUMENTS 9,185,665 B2 * 11/2015 Kim .................... H04W 52/365
9,419,768 B2 * 8/2016 Kim ...................... H04L 5/0058
(Continued)

FOREIGN PATENT DOCUMENTS

CN         101472331 A       7/2009

OTHER PUBLICATIONS

3GPP TS 36.321 V10.1.0; 3rd Generation Partnership Project; Technical Specification Group Radio Access Network; Evolved Universal Terrestrial Radio Access (E-UTRA); "Medium Access Control (MAC) protocol specification (Release 10)"; Mar. 2011.
(Continued)

*Primary Examiner* — Dominic Rego
(74) *Attorney, Agent, or Firm* — Myers Wolin, LLC (57) ABSTRACT

A base station configured for carrier aggregation, includes: a receiver; and processing circuitry coupled to the receiver and configured to: allocate to a user equipment uplink resources for at least one activated serving cell configured with an uplink carrier, the uplink resources for new transmission and the allocated uplink resources may accommodate a power headroom report, and obtain, responsive to the allocated uplink resources, a configured maximum output power for an activated serving cell configured with an uplink carrier, where the activated serving cell has non-adaptive retransmission of uplink data, or the activated serving cell where the base station schedules channel state information but no allocated uplink grant for transmitting data of an uplink shared channel.

1 Claim, 7 Drawing Sheets

Related U.S. Application Data

No. 14/066,128, filed on Oct. 29, 2013, now Pat. No. 9,241,317, which is a continuation of application No. PCT/CN2011/073549, filed on Apr. 29, 2011.

(51) Int. Cl.
  H04W 52/36    (2009.01)
  H04L 5/00     (2006.01)
  H04W 24/10    (2009.01)
  H04W 74/00    (2009.01)

(52) U.S. Cl.
  CPC ....... *H04W 52/365* (2013.01); *H04W 52/367* (2013.01); *H04W 74/002* (2013.01)

(58) Field of Classification Search
  USPC ...... 455/522, 67.11, 68–70, 450–452.2, 464, 455/509; 370/318
  See application file for complete search history.

(56) References Cited

U.S. PATENT DOCUMENTS

| | | | | |
|---|---|---|---|---|
| 2009/0303954 | A1* | 12/2009 | Guo | H04L 47/14 370/329 |
| 2009/0318180 | A1* | 12/2009 | Yi | H04W 52/365 455/522 |
| 2011/0092217 | A1* | 4/2011 | Kim | H04W 52/367 455/450 |
| 2011/0243016 | A1 | 10/2011 | Zhang et al. | |
| 2012/0082043 | A1 | 4/2012 | Hwang et al. | |
| 2012/0113919 | A1* | 5/2012 | Kone | H04W 52/365 370/329 |
| 2012/0214537 | A1 | 8/2012 | Kim et al. | |
| 2012/0314640 | A1 | 12/2012 | Kim et al. | |
| 2013/0225228 | A1 | 8/2013 | Park et al. | |
| 2013/0329663 | A1 | 12/2013 | Pelletier et al. | |
| 2015/0195797 | A1* | 7/2015 | Haim | H04W 52/365 455/522 |
| 2016/0373233 | A1* | 12/2016 | Pelletier | H04W 52/365 |

OTHER PUBLICATIONS

Ericsson; "Summary of e-mail discussion [70#15] LTE CA: PHR Handling"; Agenda Item: 7.1.1.6; 3GPP TSG-RAN WG2 #70bis; Tdoc R2-103580; Stockholm, Sweden; Jun. 28-Jul. 2, 2010.
Notice of Reason for Rejection issued for corresponding Japanese Patent Application No. 2014-506719, mailed on Feb. 3, 2015, with an English translation.
Catt, "Further considerations on LTE-A uplink power control", Agenda Item: 6.2.5, 3GPP TSG RAN WG1 Meeting #60bis, R1-101762, Beijing, China, Apr. 12-16, 2010.
Qualcomm Incorporated, "On multiplexing ACK/NAK with CQI on PUCCH", Agenda Item: 6.2.1, 3GPP TSG RAN WG1 Meeting #64, R1-110908, Taipei, Taiwan, Feb. 21-25, 2011.
MediaTek, "Open issues for Pcmax reporting", Agenda Item: 7.1.1.4, 3GPP TSG-RAN WG2 Meeting #72, R2-106203, Jacksonville, USA, Nov. 15-19, 2010.
MediaTek Inc., "Remaining issues on Pcmax reporting", Agenda Item: 7.1.4, 3GPP TSG-RAN WG2 Meeting #72bis, R2-110240, Dublin, Ireland, Jan. 17-21, 2011.
Office Action issued for corresponding Mexican Patent Application No. MX/a/2013/012642 dated Jan. 23, 2015, with English summary.
3GPP TS 36.321 V10.1.0; "3rd Generation Partnership Project; Technical Specification Group Radio Access Network; Evolved Universal Terrestrial Radio Access (E-UTRA); Medium Access Control (MAC) protocol specification (Release 10)", Mar. 2011.
Ericsson, "Summary of e-mail discussion [70#15] LTE CA: PHR Handling", Agenda Item: 7.1.1.6, 3GPP TSG-RAN WG2 Meeting #70bis, R2-103580, Stockholm, Sweden, Jun. 28-Jul. 2, 2010.
Extended European search report with supplementary European search report and the European search opinion issued for corresponding European Patent Application No. 11864501.9, mailed on Jan. 7, 2015.
3GPP TS 36.213 V10.1.0, "3rd Generation Partnership Project; Technical Specification Group Radio Access Network; Evolved Universal Terrestrial Radio Access (E-UTRA); Physical layer procedures (Release 10)", Mar. 2011.
3GPP TS 36.321 V10.1.0, "3rd Generation Partnership Project; Technical Specification Group Radio Access Network; Evolved Universal Terrestrial Radio Access (E-UTRA); Medium Access Control (MAC) protocol specification (Release 10)", Mar. 2011.
Erricsson, "Summary of e-mail discussion [70#15] LTE CA: PHR Handling", Agenda Item: 7.1.1.6, 3GPP TSG-RAN WG2 Meeting #70bis, Tdoc R2-103580, Stockholm, Sweden, Jun. 28-Jul. 2, 2010.
Notice of Preliminary Rejection issued for corresponding Korean Patent Application No. 10-2013-7031172, mailed on Jan. 27, 2015, with English translation.
Office Action issued by the Mexican Institute of Industrial Property for corresponding Mexican Patent Application No. MX/a/2013/012642, dated Apr. 24, 2015, with an English translation.
Office Action issued by the Canadian Intellectual Property Office for corresponding Canadian Patent Application No. 2,834,984, dated May 13, 2015.
Non-Final Office Action issued by the USPTO on Apr. 10, 2015, for co-pending U.S. Appl. No. 14/066,128.
Final Office Action issued by the USPTO on Feb. 12, 2016, for co-pending U.S. Appl. No. 14/066,128.
Non-Final Office Action issued by the USPTO on Aug. 26, 2015, for co-pending U.S. Appl. No. 14/945,796.
Examination Report of the corresponding Indonesian patent application No. W00 2013 05391, mailed Mar. 30, 2016, with an English translation.
Second Notification of Office Action issued by the State Intellectual Property Office of China for corresponding Chinese Patent Application No. 201180070521.9, dated Nov. 18, 2016, with an English translation.
Notice of Preliminary Rejection issued by the Korean Intellectual Property Office for corresponding Korean Patent Application No. 10-2016-7035833, mailed on Feb. 8, 2017, with English translation.
Third Office Action issued for corresponding Chinese Patent Application No. 201180070521.9 mailed on Mar. 27, 2017 with English translation attached.

\* cited by examiner

METHOD FOR CONFIGURED MAXIMUM OUTPUT POWER REPORTING AND USER EQUIPMENT

CROSS-REFERENCE TO RELATED APPLICATIONS

This application is a continuation of U.S. application Ser. No. 14/945,813, filed Nov. 19, 2015, now pending, which is a continuation of U.S. application Ser. No. 14/066,128, filed Oct. 29, 2013, now U.S. Pat. No. 9,241,317, issued Jan. 19, 2016, which is a continuation of International Application No. PCT/CN2011/073549, filed on Apr. 29, 2011, the contents of each are herein wholly incorporated by reference.

TECHNICAL FIELD

The present invention relates to the field of communications, and in particular to a method for configured maximum output power reporting and user equipment.

BACKGROUND ART

In a long-term evolution (LTE) system, in order that a base station indicates an appropriate transmission power control command to user equipment, an appropriate modulation and coding scheme and bandwidth are scheduled for the user equipment, the user equipment needs to measure its power headroom (PH) and report the PH to the base station. Wherein, the PH is a difference between configured maximum output power ($P_{CMAX}$) of the user equipment and the current transmission power.

In the LTE system, as the range of error between the configured maximum output power actually used in transmitting uplink data by the user equipment and the configured maximum output power used by the user equipment that is estimated by the base station is relatively small, in a power headroom report (PHR), the user equipment needs only report the PH, and the configured maximum output power is estimated by the base station itself.

In an LTE-advanced (LTE-A) system, as a carrier aggregation technology is used, when user equipment transmits uplink data in multiple serving cells simultaneously, if the configured maximum output power used by the user equipment is still estimated by a base station, there would be a relatively large difference between the configured maximum output power obtained by the base station through estimation and the configured maximum output power actually used by the user equipment, which will have effect on the base station in scheduling resources for the user equipment.

Currently, in an LTE-A system, in order to avoid the above effect, when the user equipment reports a PHR, besides the PHR, a configured maximum output power $P_{CMAX}$ needs also to be reported under a certain condition.

Wherein, when the user equipment is configured with multiple serving cells, if the user equipment triggers a PHR and the PHR may be contained by an uplink resource allocated by the base station to the user equipment, the user equipment will simultaneously report all the PHs in serving cells in activated states and configured with uplink carriers; while according to provisions in protocols, the user equipment reports only the configured maximum output power $P_{CMAX}$ to which a serving cell having valid uplink grant corresponds. For a serving cell having no uplink grant, in order to obtain the PH of the serving cell, reference values of parameters needing to be used in calculating the PH are defined in the protocols. According to the reference values defined in the protocols, the base station may accurately calculate the configured maximum output power $P_{CMAX}$ used by the user equipment in each serving cell having no uplink grant.

However, in the implementation of the present invention, the inventors found that following defect exists in the prior art: if the user equipment has no valid uplink grant in at least one serving cell, but there exists actual physical transmission in the serving cell, such as uplink no-adaptive retransmission, or the base station schedules only channel station information, the user equipment cannot report the configured maximum output power $P_{CMAX}$ to which the serving cell corresponds. However, the user equipment will have actual configured maximum output power $P_{CMAX}$ in the serving cell. In such a case, if the base station calculates the configured maximum output power $P_{CMAX}$ in the serving cell according to the reference values defined in the protocols, there will be a relatively large error between the configured maximum output power $P_{CMAX}$ obtained through calculation and the actual configured maximum output power, which will have effect on the subsequent control of the transmission power of the user equipment by the base station in the serving cell, as well as determination of its modulation and coding scheme and bandwidth scheduling. There has no solution for the above defect till now.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An aspect of the embodiments of the present invention is to provide a method for configured maximum output power reporting and user equipment. With the method, when there exists actual physical transmission in a serving cell, such as uplink no-adaptive retransmission, or a base station schedules only channel station information, the user equipment is able to report a value of the configured maximum output power to which the serving cell corresponds, thereby solving the problem existed in the prior art.

According to one aspect of the embodiments of the present invention, there is provided a method for configured maximum output power reporting, including:

judging sequentially, by user equipment, whether there exists non-adaptive retransmission of uplink data in each of serving cells, or judging whether a base station schedules only channel status information in each of serving cells and does not allocate an uplink grant to transmit data of an uplink shared channel, when the user equipment triggers a power headroom report at a current subframe, the base station allocates an uplink grant to the user equipment for transmitting new data on an uplink shared channel, and the uplink grant is capable of containing the power headroom report;

obtaining, if the result of judging is positive, by the user equipment, a configured maximum output power corresponding to the serving cell where the non-adaptive retransmission of uplink data exists, or the serving cell where only channel status information is scheduled and no uplink grant is allocated to transmit data of the uplink shared channel; and reporting the obtained configured maximum output power to the base station.

According to another aspect of the embodiments of the present invention, there is provided user equipment, including:

a first judgment unit, configured to judge whether a power headroom report is triggered at a current subframe;

a second judgment unit, configured to judge whether a base station allocates at the current subframe an uplink grant to the user equipment for transmitting new data on an uplink shared channel, when the result of judging of the first judgment unit is positive;

a third judgment unit, configured to judge whether the uplink grant is capable of containing the power headroom report, when the result of judging of the second judgment unit is positive;

a fourth judgment unit, configured to judge sequentially whether there exists non-adaptive retransmission of uplink data in each of serving cells within the current subframe, or judge whether a base station schedules only channel status information in each of serving cells and does not allocate an uplink grant to transmit data of an uplink shared channel, when the result of judging of the third judgment unit is positive;

a first power acquiring unit, configured to acquire a configured maximum output power corresponding to the serving cell where the non-adaptive retransmission of uplink data exists, or the serving cell where only channel status information is scheduled and no uplink grant is allocated to transmit data of the uplink shared channel, when the result of judging of the fourth judgment unit is positive; and a first transmitting unit, configured to report to the base station the configured maximum output power obtained by the first power acquiring unit.

According to a further aspect of the embodiments of the present invention, there is provided a computer-readable program, wherein when the program is executed in user equipment, the program enables the computer to carry out the method for configured maximum output power reporting as described above in the user equipment.

According to still another aspect of the embodiments of the present invention, there is provided a storage medium in which a computer-readable program is stored, wherein the computer-readable program enables the computer to carry out the method for configured maximum output power reporting as described above in user equipment.

The advantage of the embodiments of the present invention resides in that with the method, when there exists no valid uplink grant but there exists actual physical transmission in a serving cell, such as uplink no-adaptive retransmission, or a base station schedules only channel station information, the user equipment is able to report a value of the configured maximum output power to which the serving cell corresponds, thereby solving the problem existed in the prior art.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The foregoing and other objects, features and advantages of the embodiments of the present invention will be apparent from the following detailed description with reference to the drawings. In the drawings.

DETAILED DESCRIPTION OF THE INVENTION

Various embodiments of the present invention are described as follows with reference to the drawings. These embodiments are illustrative only and are not intended to limit the present invention. For easy understanding of the principle and embodiments of the present invention by those skilled in the art, the embodiments of the present invention shall be described taking configured maximum output power reporting of an LTE-A system as an example. However, it should be understood that the present invention is not limited thereto, and is applicable to any other systems related to configured maximum output power reporting.

Currently, when user equipment triggers a power headroom report and a base station allocates to the user equipment an uplink grant for transmitting new data and the uplink grant is capable of containing the power headroom report (PHR), the user equipment reports the configured maximum output power used in calculating the power headroom (PH), if for each activated serving cell configured with an uplink carrier according to existing protocols and the user equipment obtains a valid uplink grant. However, if there is no valid uplink grant in a serving cell, but there exists actual physical transmission in the serving cell, such as uplink no-adaptive retransmission, or the base station schedules only channel station information, when the actual configured maximum output power of the user equipment is needed, the user equipment cannot report the configured maximum output power $P_{CMAX}$. In such a case, if the base station calculates the configured maximum output power $P_{CMAX}$ in the serving cell according to the reference values defined in the protocols, there will be a relatively large error between the actual and the calculated configured maximum output power $P_{CMAX}$, which will have effect on the subsequent control of the transmission power of the user equipment by the base station in the serving cell, as well as determination of its modulation and coding scheme and bandwidth scheduling.

Figure 1A:
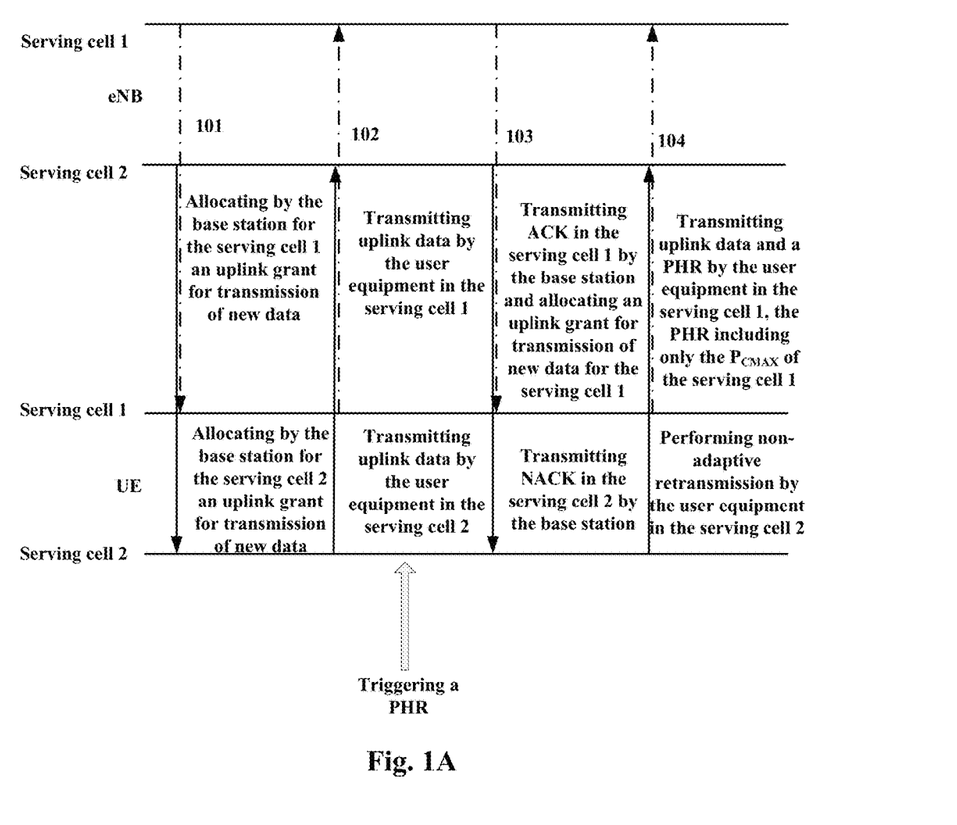
FIGS. 1A and 1B are schematic diagrams of two scenarios of currently reporting configured maximum output power.

FIG. 1A is a schematic diagram of scenario 1 of currently reporting configured maximum output power. Two serving cells, serving cell 1 and serving cell 2, are taken as examples for description. As shown in FIG. 1A, when the user equipment triggers a power headroom report PHR and the base station allocates to the user equipment an uplink grant for transmitting new data on an uplink shared channel and the uplink grant is capable of containing the power headroom report, the user equipment has no valid uplink grant in the serving cell 2 in an activated state configured with an uplink carrier but has non-adaptive retransmission of uplink data in the serving cell 2, the terminal equipment cannot report the configured maximum output power $P_{CMAX}$ of the serving cell 2 according to exiting protocols, and can only report the configured maximum output power $P_{CMAX}$ of the serving cell 1.

Figure 1B:
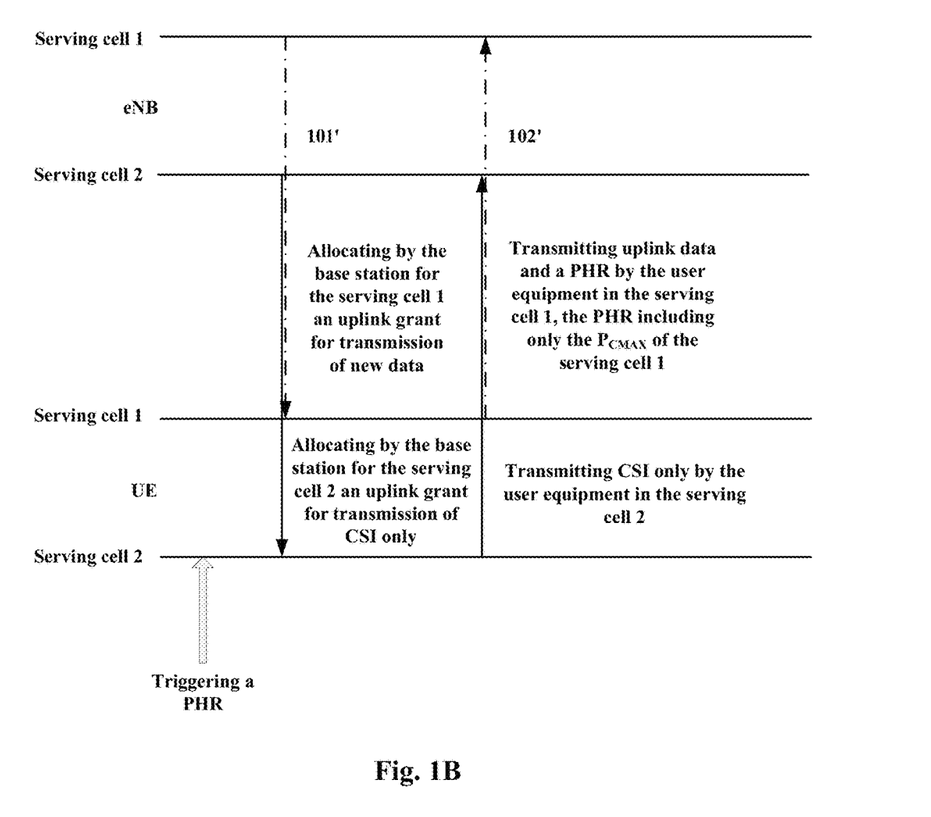

FIG. 1B is a schematic diagram of scenario 2 of currently reporting configured maximum output power. As shown in FIG. 1B, when the user equipment triggers a power headroom report and the base station allocates to the user equipment an uplink grant for transmitting new data on an uplink shared channel and the uplink grant is capable of containing the power headroom report, the user equipment has no valid uplink grant in the serving cell 2 in an activated state configured with an uplink carrier, transmits only channel state information (CSI), but has no data from an uplink shared channel, the user equipment cannot report the configured maximum output power $P_{CMAX}$ of the serving cell 2 according to exiting protocols, and only reports the configured maximum output power $P_{CMAX}$ of the serving cell 1.

Wherein, the valid uplink grant refers to a grant allocated by a base station to user equipment for transmitting data (transmitting new data or adaptively retransmitted data) on an uplink shared channel. In the two scenarios shown in FIGS. 1A and 1B, in 103 and 101', the base station allocates an uplink grant for the serving cell 1 for uplink transmission of new data, but does not do so in the serving cell 2. Therefore, according to the existing protocols, the user equipment cannot report the configured maximum output power $P_{CMAX}$ of the serving cell 2.

However, in the two scenarios shown in FIGS. 1A and 1B, the user equipment will have actual configured maximum output power $P_{CMAX}$ in the serving cell 2. In such a case, if the base station calculates the configured maximum output power $P_{CMAX}$ in the serving cell 2 according to the reference values defined in the protocols, there will be a relatively large error between the actual and the calculated configured maximum output power $P_{CMAX}$, which will have effect on the subsequent control of the transmission power of the user equipment by the base station in the serving cell 2, as well as determination of its modulation and coding scheme and bandwidth scheduling. As to the above problem, the embodiments of the present invention provide a method for configured maximum output power reporting and user equipment. Following description is given taking the above two scenarios as examples.

Figure 2:
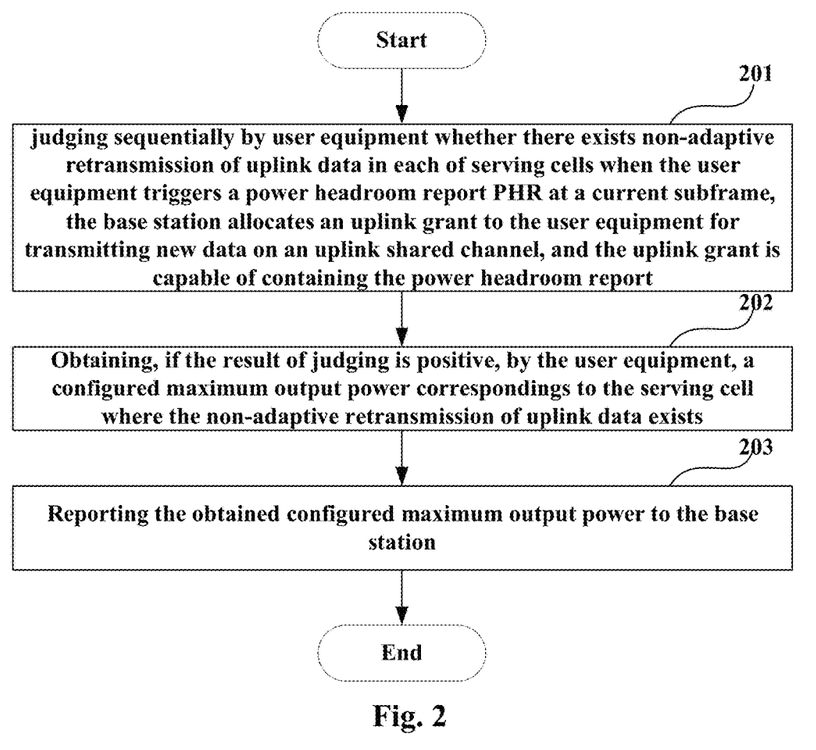
FIG. 2 is a flowchart of the method for configured maximum output power reporting of Embodiment 1 of the present invention.

FIG. 2 is a flowchart of the method for configured maximum output power reporting of Embodiment 1 of the present invention. As shown in FIG. 2, the method includes:

step 201: judging sequentially, by user equipment, whether there exists non-adaptive retransmission of uplink data in each of serving cells when the user equipment triggers a power headroom report PHR at a current subframe, the base station allocates an uplink grant to the user equipment for transmitting new data on an uplink shared channel, and the uplink grant is capable of containing the power headroom report;

step 202: obtaining, if the result of judging is positive, by the user equipment, a configured maximum output power corresponding to the serving cell where the non-adaptive retransmission of uplink data exists; and step 203: reporting the obtained configured maximum output power to the base station.

Figure 3:
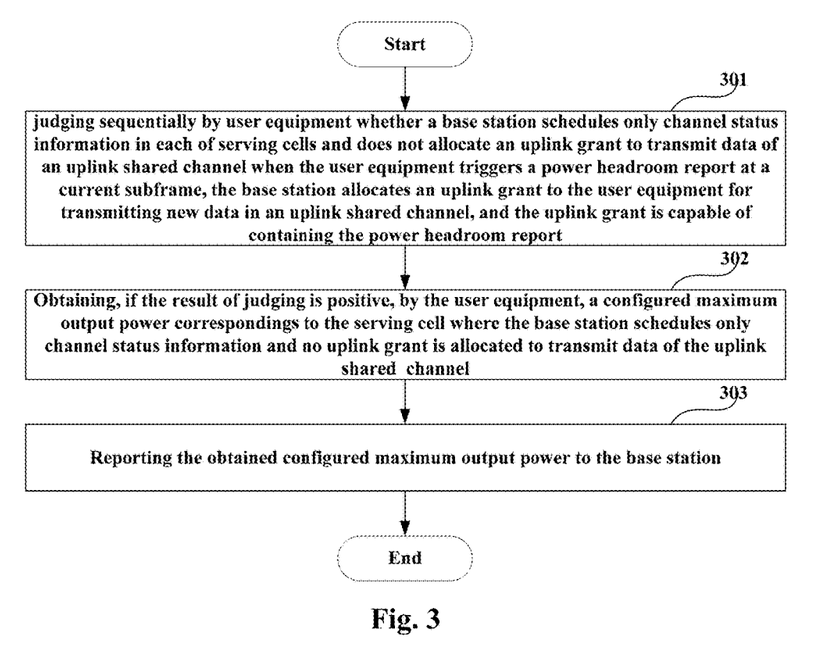
FIG. 3 is a flowchart of the method for configured maximum output power reporting of Embodiment 2 of the present invention.

FIG. 3 is a flowchart of the method for configured maximum output power reporting of Embodiment 2 of the present invention. As shown in FIG. 3, the method includes:

step 301: judging sequentially, by user equipment, whether a base station schedules only channel status information in each of serving cells and does not allocate an uplink grant to transmit data of an uplink shared channel, when the user equipment triggers a power headroom report at a current subframe, the base station allocates an uplink grant to the user equipment for transmitting new data on an uplink shared channel, and the uplink grant is capable of containing the power headroom report;

step 302: obtaining, if the result of judging is positive, by the user equipment, a configured maximum output power corresponding to the serving cell where the base station schedules only channel status information and no uplink grant is allocated to transmit data of the uplink shared channel; and step 303: reporting the obtained configured maximum output power to the base station.

In the above embodiments 1 and 2, each of the above serving cells is in an activated state and is configured with an uplink carrier.

In the above embodiments 1 and 2, in steps 202 and 302, the user equipment obtains the configured maximum output power $P_{CMAX}$ from a physical layer.

In the above embodiments 1 and 2, in steps 203 and 303, the user equipment contains the obtained configured maximum output power $P_{CMAX}$ in a PHR to report to the base station.

In the above embodiments 1 and 2, in steps 201 and 301, when the user equipment triggers a power headroom report PHR at the current subframe, the base station allocates an uplink grant to the user equipment for transmitting new data in an uplink shared channel, and the uplink grant is capable of containing the power headroom report, the user equipment may further determine to report the configured maximum output power $P_{CMAX}$ to which the serving cell where there exists the uplink grant corresponds, and the user equipment may obtain the configured maximum output power $P_{CMAX}$ to which the serving cell corresponds from a physical layer. In this embodiment, the user equipment may contain the configured maximum output power $P_{CMAX}$ to which the serving cell where there exists the uplink grant corresponds, and the configured maximum output power $P_{CMAX}$ to which the serving cell where there exists the non-adaptive retransmission of the uplink data corresponds, or the configured maximum output power $P_{CMAX}$ to which the serving cell where the user equipment schedules only channel state information but no uplink grant is allocated for transmitting data of an uplink shared channel corresponds, in the PHR, to report to the base station.

Figure 4:
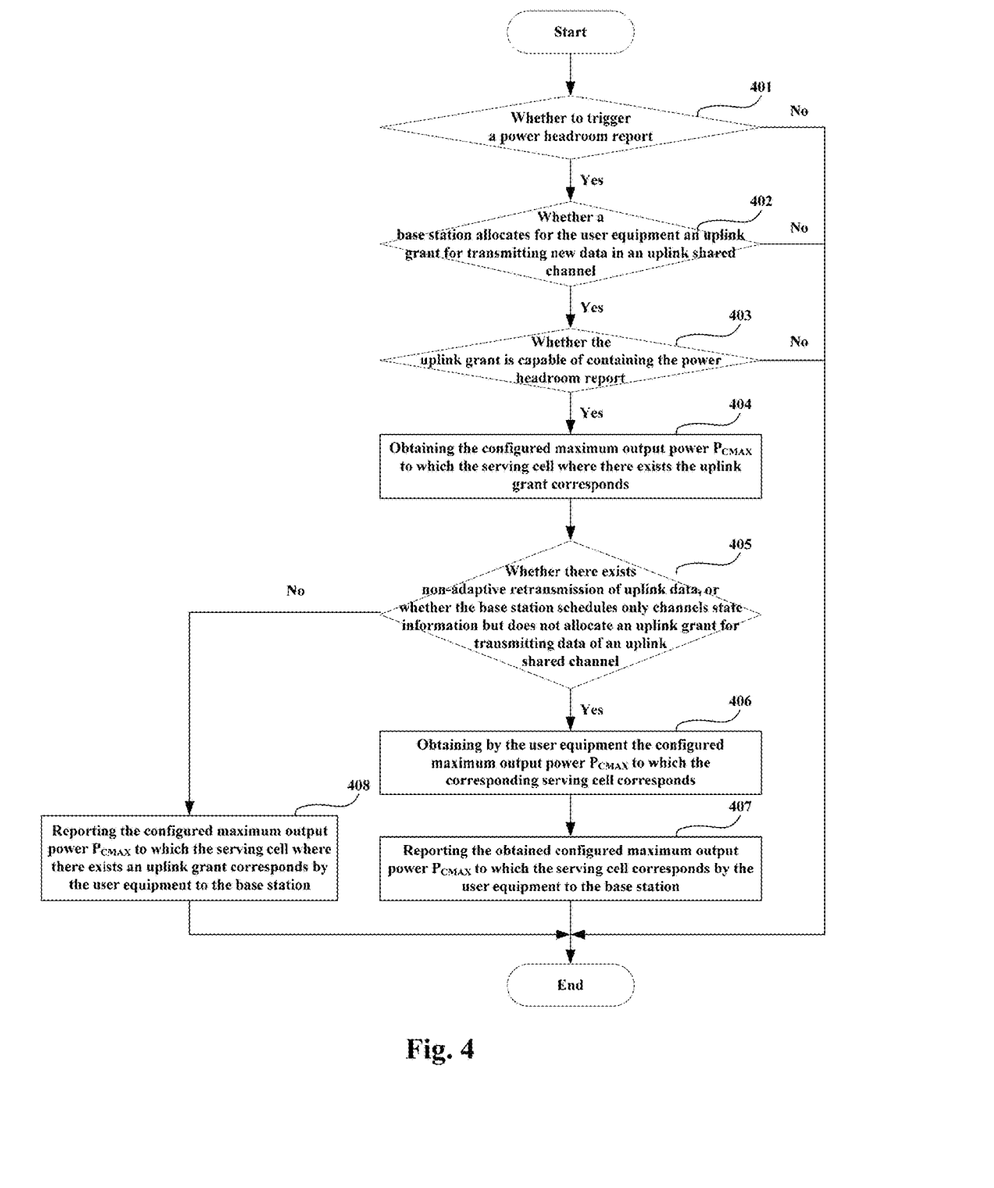
FIG. 4 is a flowchart of the method for configured maximum output power reporting of Embodiment 3 of the present invention.

FIG. 4 is a flowchart of the method for configured maximum output power reporting of Embodiment 3 of the present invention. The following description is given to the method for configured maximum output power reporting of the embodiment of the present invention with reference to FIGS. 1A, 1B and 4.

As shown in FIG. 4, in actual implementation, in each subframe, the method includes:

step 401: judging by user equipment whether to trigger a power headroom report PHR; and executing step 402 if the result of judging is positive; otherwise, terminating the process;

wherein, as shown in FIGS. 1A and 1B, the PHR has been triggered;

step 402: judging further by the user equipment whether a base station allocates for the user equipment an uplink grant for transmitting new data on an uplink shared channel, if the PHR is triggered; and executing step 403 if the result of judging is positive; otherwise, terminating the process;

wherein, as shown in FIGS. 1A and 1B, in the serving cell 1, the base station has allocated an uplink grant for transmitting new data on an uplink shared channel (see 103 and 101');

step 403: judging further by the user equipment whether the uplink grant is capable of containing the power headroom report PHR, if the base station allocates for the user equipment the uplink grant for transmitting new data on an uplink shared channel; and executing step 404 if the result of judging is positive; otherwise, terminating the process;

step 404: obtaining the configured maximum output power $P_{CMAX}$ to which the serving cell where there exists the uplink grant corresponds according to the existing protocols, if the result of judging is that the PHR may be contained;

wherein, as shown in FIGS. 1A and 1B, the user equipment may obtain the configured maximum output power $P_{CMAX}$ of the serving cell 1 from a physical layer, with the process of obtaining being similar to the prior art, which shall not be described herein any further;

step 405: judging further by the user equipment whether there exists non-adaptive retransmission of uplink data in each serving cell, or judging by the user equipment whether the base station schedules only channels state information in each serving cell but does not allocate an uplink grant for transmitting data of an uplink shared channel; and executing step 406 if the result of judging is positive; otherwise, executing step 408;

wherein, as shown in FIGS. 1A and 1B, the user equipment may learn that there exist the above two cases in the serving cell 2;

step 406: obtaining by the user equipment the configured maximum output power $P_{CMAX}$ to which the serving cell where there exists the non-adaptive retransmission of uplink data corresponds, or the configured maximum output power $P_{CMAX}$ to which the serving cell where the base station schedules only channels state information but does not allocate an uplink grant for transmitting data of an uplink shared channel corresponds, if the result of judging is positive;

wherein, likewise, the user equipment may obtain the configured maximum output power $P_{CMAX}$ from a physical layer, with the process of obtaining being similar to the prior art, which shall not be described herein any further;

step 407: reporting the configured maximum output power $P_{CMAX}$ obtained in steps 404 and 406 by the user equipment to the base station;

wherein, the configured maximum output power $P_{CMAX}$ may be contained in the PHR to report to the base station; thus, in FIGS. 1A and 1B, the user equipment may transmit uplink data and the PHR in the serving cell 1, the PHR including the configured maximum output power $P_{CMAX}$ of the serving cell 1 and the serving cell 2 obtained in steps 404 and 406;

step 408: reporting the configured maximum output power $P_{CMAX}$ obtained in step 404 by the user equipment to the base station.

The above flows are illustrative and exemplary only, and the method of the embodiments of the present invention is not necessary to include each of the steps above, with some of the steps being able to be deleted, combined or changed in order. The method of the embodiments of the present invention is not limited to be executed in the described temporal orders, and may also be otherwise executed temporally, in parallel, or independently. And such variants shall be covered by the present invention without departing from the spirits and scope of the present invention. For example, step 401 may be executed after step 402 or 403, or steps 401-403 may be executed in a combined manner, or steps 404 and 406 may be executed in a combined manner, etc.

With the embodiments above, in the two scenarios shown in FIGS. 1A and 1B, the user equipment may not only report the configured maximum output power $P_{CMAX}$ of the serving cell 1, but also report the configured maximum output power $P_{CMAX}$ of the serving cell 2, thereby solving the problem existed in the prior art.

It can be seen from the above embodiments that with the method of the embodiments of the present invention, the user equipment is enabled to report a value of configured maximum output power to which a serving cell corresponds, even if there exists no valid uplink grant in the serving cell, but there exists actual physical transmission, such as uplink non-adaptive retransmission, or the base station schedules only channel state information, without having effect on the subsequent control of the transmission power of the user equipment by the base station in the serving cell, as well as determination of its modulation and coding scheme and bandwidth scheduling, and solving the problem existed in the prior art.

An embodiment of the present invention further provides user equipment, as described in embodiments 3 and 4 below. As the principle of the user equipment for solving problem is similar to that of the method for reporting based on the user equipment, the implementation of the method may be referred to for the implementation of the user equipment, and the repeated parts shall not be described any further.

Figure 5:
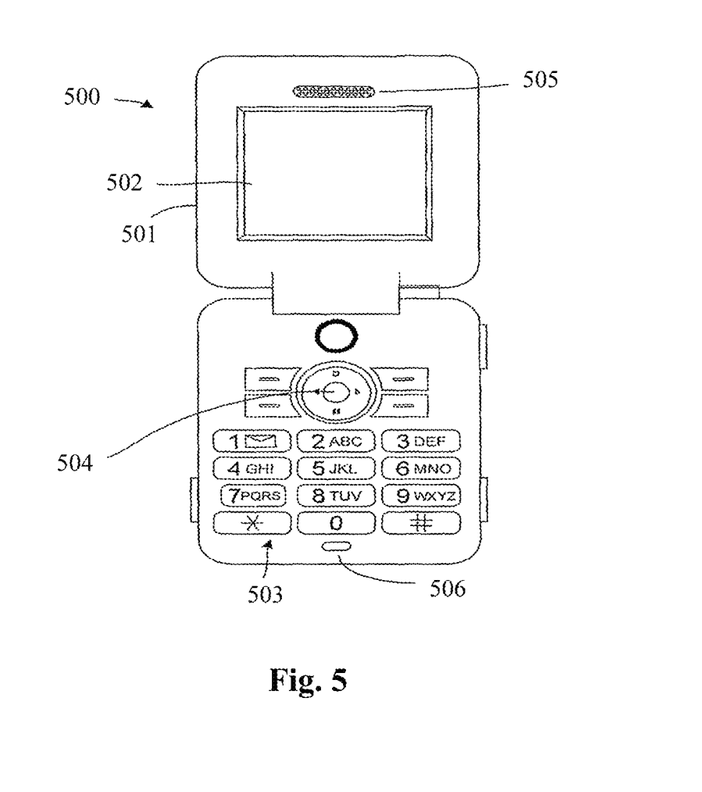
FIG. 5 is a schematic diagram of a mobile phone used as an example of the user equipment.

FIG. 5 is a schematic diagram of a mobile phone used as an example of the user equipment. Examples of the user equipment are not limited to a mobile phone. And the user equipment may also be any devices capable of communicating, such as a game player, a PDA, and a portable computer, etc.

As shown in FIG. 5, the mobile phone 500 may be a flip-lid phone having a flip lid 501 movable between an open position and a closed position. In FIG. 5, the flip lid 501 is shown as being in the open position. It should understood that the mobile phone 500 may also be of other structures, such as a "bar phone" or a "slide-lip phone" structure.

The mobile phone 500 may include a display 502. The display 502 displays such information to a user as an operational state, time, phone number, telephone directory information, and various menus, etc., so that the user is enabled to use various characteristics of the mobile phone 500. The display 502 may also be used to visibly display contents received by the mobile phone 500 and/or retrieved from a memory (not shown) of the mobile phone 500. The display 502 may be used to display images, videos and other graphics to a user, such as photos, mobile TV contents and videos related to games, etc.

A keyboard 503 provides multiple user input operations. For example, the keyboard 503 may include an alphanumeric key permitting input of alphanumeric information (such as a phone number, a phone list, telephone directory information, a notebook, and a text, etc.). Furthermore, the keyboard 503 may include specific functional keys 504, such as a "call transmit" key to initiate a call or respond a call, and a "call end" key to end or "hang up" a call. The specific functional keys may further include a menu navigation key and a selection key on the menu of the display 502 for convenient navigation. For example, a pointing device and/or a navigation key may be provided to receive directional input from a user. Furthermore, the display 502 and the keyboard 503 may be combined in use for carrying out a function of a soft key. The mobile phone 500 may further include parts necessary for carrying out its functions, such as an antenna, a microcontroller, a loudspeaker 505, and a microphone 506, etc.

Figure 6:
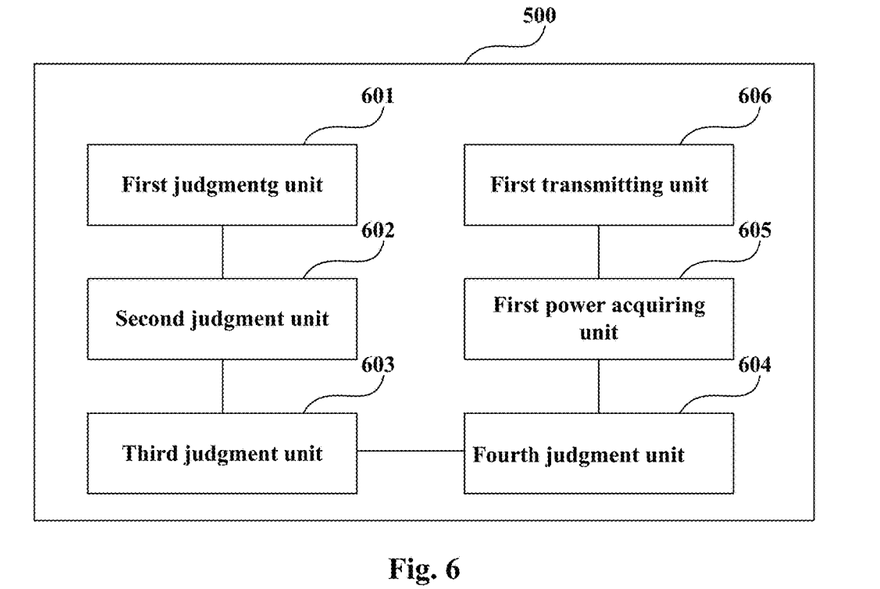
FIG. 6 is a schematic diagram of the composition of the user equipment of Embodiment 4 of the present invention.

FIG. 6 is a schematic diagram of the composition of the user equipment of Embodiment 4 of the present invention. As shown in FIG. 6, the user equipment according to an embodiment of the present invention includes a first judgment unit 601, a second judgment unit 602, a third judgment unit 603, a fourth judgment unit 604, a first power acquiring unit 605 and a first transmitting unit 606; wherein, the first judgment unit 601 is configured to judge whether a power headroom report is triggered at a current subframe;

the second judgment unit 602 is configured to judge whether a base station allocates at the current subframe an uplink grant to the user equipment for transmitting new data on an uplink shared channel (PUSCH) when the result of judging of the first judgment unit 601 is positive;

the third judgment unit 603 is configured to judge whether the uplink grant is capable of containing the power headroom report when the result of judging of the second judgment unit 602 is positive;

the fourth judgment unit 604 is configured to judge sequentially whether there exists non-adaptive retransmission of uplink data in each of serving cells within the current subframe when the result of judging of the third judgment unit 603 is positive;

the first power acquiring unit 605 is configured to acquire a configured maximum output power corresponding to the serving cell where the non-adaptive retransmission of uplink data exists when the result of judging of the fourth judgment unit 604 is positive; and the first transmitting unit 606 is configured to report to the base station the configured maximum output power obtained by the first power acquiring unit 605.

Figure 7:
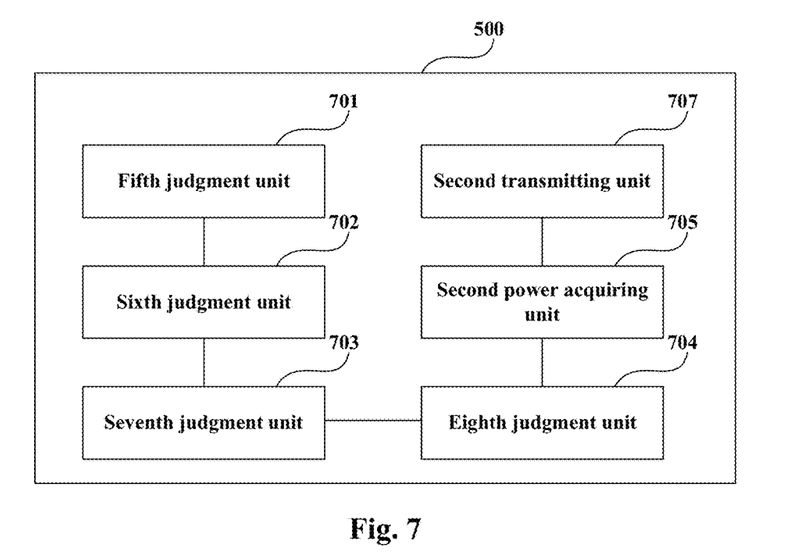
FIG. 7 is a schematic diagram of the composition of the user equipment of Embodiment 5 of the present invention.

FIG. 7 is a schematic diagram of the composition of the user equipment of Embodiment 5 of the present invention. As shown in FIG. 7, the user equipment according to an embodiment of the present invention includes a fifth judgment unit 701, a sixth judgment unit 702, a seventh judgment unit 703, an eighth judgment unit 704, a second power acquiring unit 705 and a second transmitting unit 706; wherein, the fifth judgment unit 701 is configured to judge whether a power headroom report is triggered at a current subframe;

the sixth judgment unit 702 is configured to judge whether a base station allocates at the current subframe an uplink grant to the user equipment for transmitting new data on an uplink shared channel when the result of judging of the fifth judgment unit 701 is positive;

the seventh judgment unit 703 is configured to judge whether the uplink grant is capable of containing the power headroom report when the result of judging of the sixth judgment unit 702 is positive;

the eighth judgment unit 704 is configured to judge sequentially whether the base station schedules only channel state information but does not allocate an uplink grant for transmitting data of the uplink shared channel in each of serving cells within the current subframe when the result of judging of the seventh judgment unit 703 is positive;

the second power acquiring unit 705 is configured to acquire a configured maximum output power corresponding to the serving cell where the base station schedules only channel state information but does not allocate an uplink grant for transmitting data of the uplink shared channel when the result of judging of the eighth judgment unit 704 is positive; and the second transmitting unit 706 is configured to report to the base station the configured maximum output power obtained by the second power acquiring unit 705.

In the above embodiments 3 and 4, each of the above serving cells is in an activated state and is configured with an uplink carrier.

In the above embodiments 3 and 4, the first power acquiring unit 605 and the second power acquiring unit 705 obtain the configured maximum output power $P_{CMAX}$ from a physical layer of the user equipment.

In the above embodiments 3 and 4, the first transmitting unit 606 and the second transmitting unit 706 may contain the obtained configured maximum output power $P_{CMAX}$ in the PHR to report to the base station.

In the above embodiments 3 and 4, the user equipment may further include a third power acquiring unit (not shown) configured to acquire configured maximum output power $P_{CMAX}$ to which a serving cell of an uplink grant for transmitting new data on an uplink shared channel (PUSCH) corresponds, when the results of estimating of the third estimating unit 603 and the seventh estimating unit 703 are positive. Therefore, the first transmitting unit 606 and the second transmitting unit 706 of the user equipment may contain the configured maximum output power $P_{CMAX}$ obtained by the third power acquiring unit and the configured maximum output power $P_{CMAX}$ obtained by the first power acquiring unit 605 and the second power acquiring unit 705 in the PHR to report to the base station.

The logic parts shown in FIGS. 5, 6 and 7 may be field programmable logic parts, microprocessors, and processors used in computers, etc.

It can be seen from the above embodiments that with the user equipment of the embodiments of the present invention, the user equipment is enabled to report a value of configured maximum output power to which a serving cell corresponds, even if there exists no valid uplink grant in the serving cell, but there exists actual physical transmission, such as uplink non-adaptive retransmission, or the base station schedules only channel state information, thereby solving the problem existed in the prior art.

An embodiment of the present invention further provides a computer-readable program, wherein when the program is executed in user equipment, the program enables the computer to carry out the method for reporting as described in embodiment 1 or 2 in the user equipment.

An embodiment of the present invention further provides a storage medium in which a computer-readable program is stored, wherein the computer-readable program enables the computer to carry out the method for reporting as described in embodiment 1 or 2 in user equipment.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A communication system, comprising:
   a user equipment; and
   a base station which communicates with the user equipment using carrier aggregation,
   wherein the user equipment includes:
     processing circuitry configured to:
       when a power headroom report has been triggered, and, for a current subframe, the user equipment has uplink resources allocated for new transmission and the allocated uplink resources may accommodate the power headroom report, judge whether for the current subframe the user equipment has non-adaptive retransmission of uplink data on an activated serving cell configured with an uplink carrier;
       obtain, from a physical layer, a configured maximum output power corresponding to the activated serving cell if for the current subframe the user equipment has non-adaptive retransmission of uplink data on the activated serving cell; and
     a transmitter configured to report the obtained configured maximum output power from the physical layer to the base station, and
   wherein the base station includes:
     a receiver configured to receive the configured maximum output power transmitted from the user equipment.

* * * * *